Nov. 24, 1970 H. HOEL 3,543,092

DISTANCE RELAYS

Filed Sept. 23, 1968 4 Sheets-Sheet 1

Nov. 24, 1970 H. HOEL 3,543,092

DISTANCE RELAYS

Filed Sept. 23, 1968 4 Sheets-Sheet 4

United States Patent Office 3,543,092

Patented Nov. 24, 1970

3,543,092

DISTANCE RELAYS

Hans Hoel, Oslo, Norway, assignor to The English Electric Company Limited, London, England, a British company Filed Sept. 23, 1968, Ser. No. 761,580
Claims priority, application Great Britain, Sept. 22, 1967, 43,335/67
Int. Cl. H02h 3/38
U.S. Cl. 317—27 9 Claims

ABSTRACT OF THE DISCLOSURE

This invention relates to a distance relay for protecting high voltage transmission and distribution lines from faults, in which the line current is monitored and its derivative (*di/dt*) is determined at the instant at which it traverses its zero datum, and in which the line voltage is rectified, together with a voltage phase-shifted therefrom, and their values added to the current derivative at the said instant. An output circuit is energised in response to any portion of these summated quantities traversing the zero datum, this output circuit extending the "reach" of the relay when employed in a "starter" unit and initiating protective action on the line when employed in a "distance measuring" unit.

This invention relates to distance relays, that is, relays operable to detect the occurrence of a fault affecting, for example, a section of power line within a certain distance of the relay location, and initiating protective action to isolate the faulty section of line in depedence on the position of the fault.

The present invention consists in a distance relay for protecting an A.C. transmission system from faults, comprising first apparatus including means for monitoring the current in the system and sensing the instant at which it traverses its zero datum, means for monitoring the voltage of the system, circuit means for rectifying said voltage together with at least one voltage phase-shifted therefrom by a predetermined amount, a summator for adding together the largest instantaneous value of the rectified unidirectional voltages with the derivative of the current at the said instant, and an output device operable in response to any portion of the waveform of the summated quantities traversing the zero datum upon the current derivative exceeding in magnitude, and opposing in sign, the rectified voltages.

The operating characteristic defined by this apparatus may embrace contiguous "zones" of the A.C. system in order to provide accurate discrimination between faults affecting various parts of the system and, in addition, further such apparatus may be provided for defining a characteristic which embraces all of the zones together. A complete distance relay scheme may thus include the first said apparatus (referred to as a measuring unit) responsive immediately to faults affecting its adjacent (first) zone and second apparatus, in accordance with the first apparatus defined above, (and referred to as a "starter") responsive to faults affecting any one of the different zones of protection, this second apparatus being operative to condition the first apparatus in a manner such as to progressively extend its "reach" to embrace the subsequent zones within its characteristic. In this instance, the said output device in the measuring unit would be operative to effect protective action, e.g. actuate a circuit-breaker and isolate the fault, whereas the output device in the starter would be operative to extend the "reach" of the measuring unit as described.

In accordance with this invention, an accurate discrimination between faults lying inside and outside these predetermined zones of protection is effected by comparing the magnitudes of voltage (E), and the derivative of the current (*di/dt*) at the instant of current zero. Now at this instant the voltage drop in the ohmic resistance of the line is zero and the voltage drop due to those components possessing inductive reactance is proportional to the said derivative of the current, $E=Ldi/dt$, so that the ratio $E:di/dt$ is indicative of the inductive reactance of the A.C. system. Since this latter quantity is known for a "healthy" system up to the boundary of each zone then it is conveniently arranged that if this ratio $E:di/dt$ is less than unit, i.e. if the magnitude of *di/dt* exceeds E, then the fault lies within the particular zone covered and the action appropriate to the measuring or starter units is taken.

In addition, the particular shape of the relay characteristic, whether it be the starting zone or the individual zones of protection, is of prime importance in affording accurate discrimination between faults and acceptable power swings etc., and between different classes of faults, and it is an important feature of this invention that these characteristics can be readily determined by adjusting the relative magnitude of the current derivative and the rectified voltages, and the phase angle between these quantities. In particular, the phase angle and relative magnitudes of the rectified voltages may be individually controlled in both the measuring and the starter units to govern the angles included by the characteristic and an additional measure of control may be effected in the measuring unit by a switching network which restricts the influence of the current derivative on the composite waveform within certain limits so as to "directionalise" the characteristic, i.e. permit the relay to respond to faults occurring in only one direction from its location.

A distance relay in accordance with this invention thus possesses the advantages of effecting accurate discrimination between various zones of protection and various classes of fault, whilst providing extreme versatility in the choice of operating characteristics required compared with more complex arrangements which have hitherto involved the use of "replica impedances" of the A.C. system to determine fault conditions and the use of a number of different circuits each defining different parts of the composite relay characteristic.

In order that the invention may be fully understood reference will now be made, by way of example, to the accompanying drawings, in which.

Figure 1:
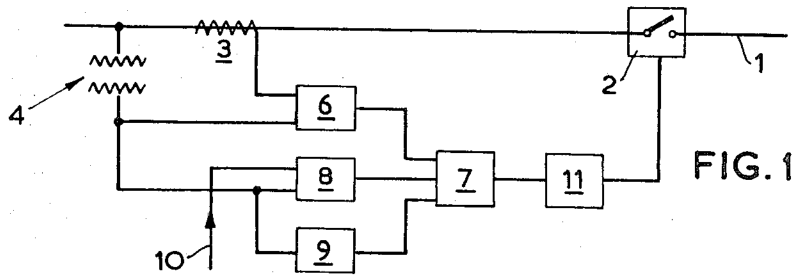
FIG. 1 is a block diagram of a relay according to this invention showing the "first" apparatus, or measuring units, as mentioned above applied to the protection of a power supply line.

Referring now to the drawings, in FIG. 1 a section of power line 1 to be protected has a breaker 2 connected in circuit with it.

The state of operation of this circuit-breaker is dependent on the line parameters e.g. its reactance which has a predetermined value for an unfaulted line at the boundary of a section or zone of this line, and should the actual measured value of this parameter differ from this predetermined value in one sense then this is indicative of a fault, e.g. a short circuit, lying within the protected zone and the circuit-breaker is actuated to isolate the fault.

In this instance, a current transformer 3 monitors the line current and a voltage transformer 4 monitors the voltage. The output from the current transformer is applied to a differentiator circuit 6 which is operative to develop at its output a voltage pulse which is the derivative of the current (*di/dt*) at the instant at which it traverses zero, these pulses being transmitted to a summator 7 provided that they occur in a certain relationship with the line voltage in a manner to be described. In turn, the output from the voltage transformer 4 is applied to rectifying networks 8, 9, the network 9 also including a phase-shifting circuit, and the resultant output from these two networks is applied to the summator 7. An input on a lead 10 from the starter, to be described, is also applied to the network 8 for the purpose of activating a time-switch.

The net output from the summator, which is a waveform consisting of the sum of the rectified voltages and the derivative of the current, i.e. a pulsating D.C., is then applied to a polarity sensitive output stage 11 which is operative to trip-out the circuit breaker 2 in the event of this output waveform traversing its zero datum.

Figure 2:
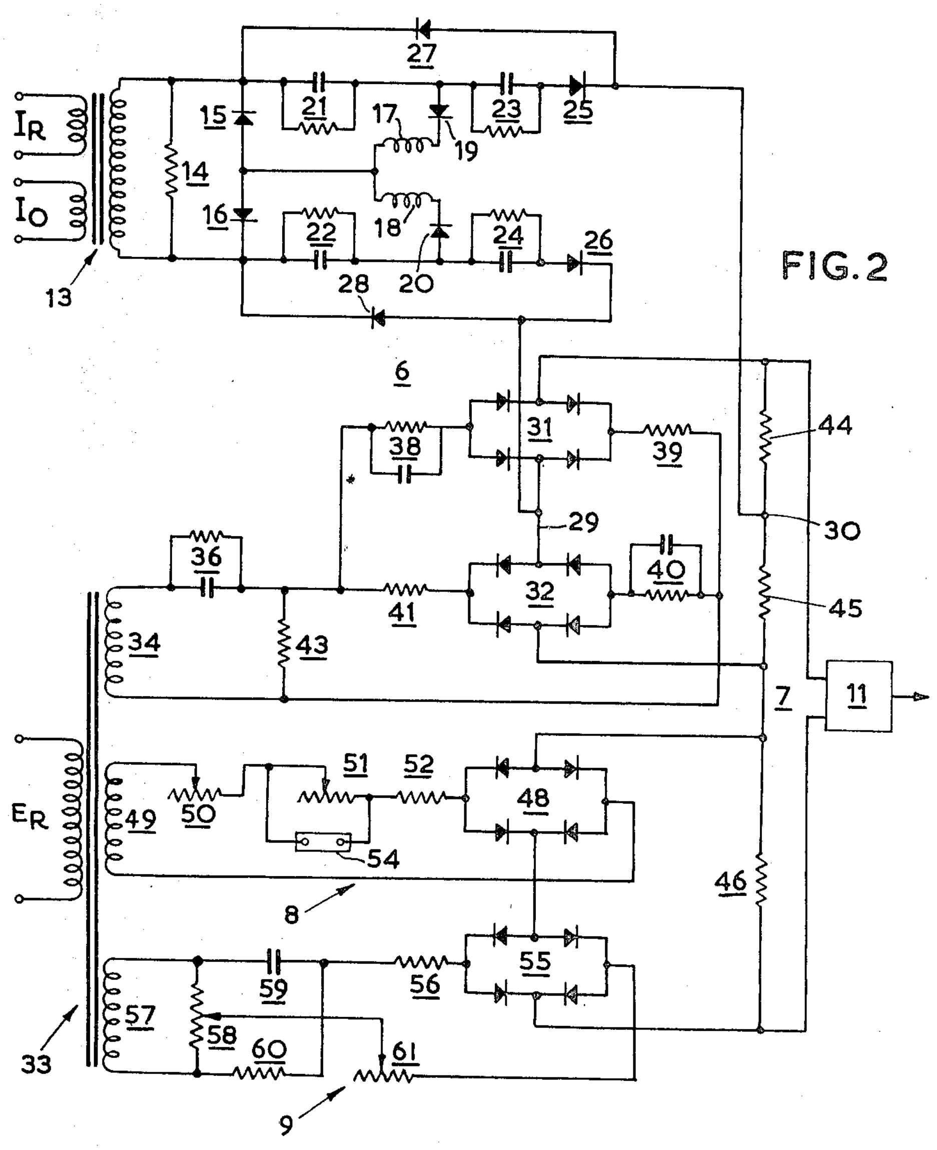
FIG. 2 is a more detailed circuit diagram of parts of the apparatus shown in FIG. 1.
Figure 3:
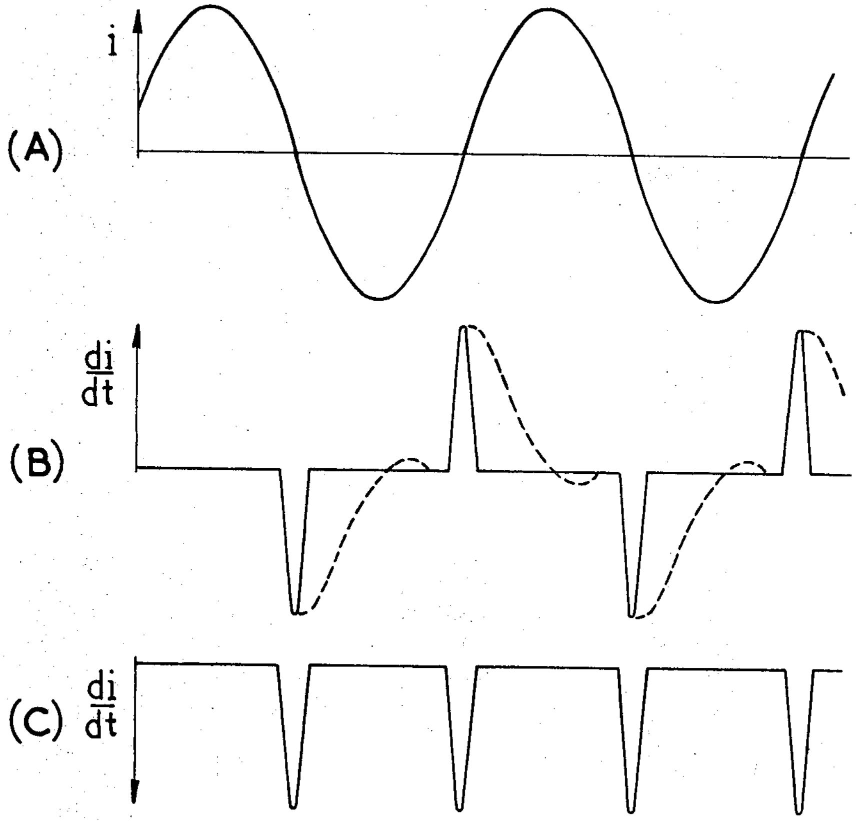
FIGS. 3A to 3C are waveforms applicable to the derivation of the quantity *di/dt*.

Referring now to FIG. 2, the circuits 6 to 9 of the measuring unit just described are shown in more detail for one phase of a system having three phases R, S, T. The current transformer 3, shown schematically in FIG. 1, is coupled to a transformer 13 having two primary windings, responsive to a selected phase current, e.g. $I_R$, and residual ground current ($I_o$), respectively, and a common secondary winding. A voltage proportional to the resulting secondary current is developed across a parallel resistor 14 and this voltage is then differentiated. More particularly, the differentiator circuit 6 comprises two identical networks operative upon the two half cycles of the waveform, the networks comprising two diodes 15, 16 arranged back-to-back with their common junction connected to a like junction between two inductors 17, 18 each connected in series with high resistance diodes 19, 20 respectively, parallel resistor-capacitor circuits 21, 22 being connected between the above mentioned diodes in the corresponding networks. Further parallel resistor-capacitor circuits 23, 24 are connected in the "outputs" of the two networks together wtih series diodes 25, 26, with diodes 27, 28 bridging the networks themselves, this latter circuitry serving to effect wave-shaping by sharpening the trailing edges of the differentiated pulses and reducing "ringing." The action of the differentiator may be understood from FIGS. 3A and 3B, FIG. 3A showing the alternating secondary current and FIG. 3B showing the differentiated pulses at the zero transition of the current waveform. In particular, the capacitors in the circuits 21, 22 charge rapidly during alternate half-cycles determined by the polarity of diodes 15, 16 and 19, 20 and then discharge through their parallel resistors. Current pulses having a sharp leading edge are developed across the appropriate inductor 17, 18 but the action of this component alone is to extend somewhat the trailing edge and cause some degree of "ringing" or overshoot beyond the zero line in the manner shown by the dotted outline in FIG. 3B. As mentioned above, the output circuitry is operative to reduce this effect and this is primarily achieved by the capacitors 23, 24 which discharge relatively slowly so that only the fast-rising front of the current waveform is transmitted through them and the "reverse" current (reduced by diodes 19 and 20) is inhibited by the appropriate diodes 25, 26. Consequently, the resultant current waveform across the output of this network, at terminals 29, 30 is of the form shown by the full lines in FIG. 3B.

The terminals 29, 30 are conected in a static switching circuit comprising two rectifier circuits 31, 32 which are "gated" by the line voltage $E_R$ fed to a voltage transformer 33. In particular, a secondary winding 34 of this transformer has connected in series with it a parallel resistor-capacitor circuit 36 for correcting the phase relationship of the control voltage with a parallel resistor-capacitor circuit 38 and a resistor 39 connected in series with the circuit 31 and a parallel resistor-capacitor circuit 40 and a resistor 41 connected in series with the circuit 32. The two rectifier circuits 31, 32 together with their associated resistors and capacitors are shunt connected across the secondary winding 34 together with a resistor 43 connected in the discharge path of the capacitor in circuit 36. The terminal 29 lies at a common junction with one arm of the circuits 31, 32 and two series-connected output resistors 44, 45 are connected between the terminal 30 and the other arm of these two circuits. This switching circuit is similar in action to the differentiator circuits described above in so far as the two half-waves of each cycle are differentiated by the capacitors 38, 40 and their associated diode rectifiers are rendered conductive in sucession; by including resistors 39, 41, however, instead of the corresponding inductors, and by avoiding the use of the wave-shaping output circuits the resultant "gating" waveform is substantially in accord with the dotted outline in FIG. 3B.

Thus, with the magnitude of the gating current through the rectifier circuits 31, 32 greater than that of the differentiated pulses across terminals 29, 30 then, provided that these pulses occur within the electrical angle occupied by the voltage gating waveform a series of unidirectional pulses (FIG. 3C) are developed across the output resistors 44, 45, alternate pulses appearing across resistor 44 and intermediate pulses appearing across resistor 45. The direction of these output pulses is determined by the relationship between the secondary current in transformer 13 and the voltage on the secondary winding 34. In the example shown, it can be assumed that the current and voltage are in phase, if they were 180° out-of-phase however, the output pulses in FIG. 3C would all be positive which, as will be shown below, will not produce a tripping signal for the circuit-breaker. In addition, it is evident that the differentiated form of the voltage pulses do not open the rectifier gates for a full half-cycle so that the total phase angle between the current and voltage which will permit the current pulses to possibly produce a tripping signal will be less than 180° and may conveniently lie between $-20°$ and $+120°$. This action is effective to "directionalize" the relay characteristic which will be more fully discussed below.

The determination of whether or not a tripping signal is produced is dependent on the resultant sum of these current pulses and the rectified line voltage, as mentioned above, the latter voltage being developed across a resistor 46 connected in series with the two output resistors 44, 45.

Referring now to this section (8, 9) of the circuit in more detail, the rectifier network 8 includes a bridge rectifier 48 which is connected across a secondary winding 49 of the transformer 33 in series with a resistor circuit comprising two variable resistors 50, 51 and a fixed resistor 52. A time switch 54 (shown closed) actuated by the starter bridges the resistor 51. The variable resistors control the amplitude of the voltage applied to the bridge rectifier 48 and in practical terms resistor 50, with the switch 54 closed, governs the reach of the distance relay, i.e. the distance over which it affords protection, in a first zone, whilst with the switch open, the resistor 51 governs its reach over a greater zone (zone two).

The rectifier network 9 includes a bridge rectifier 55 which with a resistor 56 is connected across a secondary winding 57 of transformer 33 together with a phase-shifting circuit. This latter circuit comprises a potentiometer 58 connected in shunt with the winding 57 and bridged by a series capacitor 59 and resistor 60. The potentiometer determines the phase shift, and the amplitude of the output, developed across the capacitor-resistor junction and the wiper arm of potentiometer 58, is determined by a variable resistor 61 connected to the wiper arm.

In operation, the voltage inputs to the bridges 48, 55 are full wave rectified and since the two bridges are series connected the largest voltage from either will at all times determine the output across the resistor 46. The output across this resistor is added to that across resistors 44 and 45 and the resultant waveform is impressed across the input to the polarity-sensitive output stage 11 which is operative to produce a tripping signal for the circuit-breaker 2 (FIG. 1) in the event of the amplitude of the pulses representative of the first derivative of current (*di/dt*) exceeding in magnitude and opposing in sign the rectified output (E) across the resistor 46. Since $$E=Ldi/dt$$

where L is the inductanc of the power line protected up to the limit of the particular zone chosen then if the ratio $E:(di/dt)$ is less than unity, this is indicative of a change in line inductance occasioned by a fault lying within that zone and if the ratio exceeds unity the fault is considered to lit outside the zone.

Figure 4:
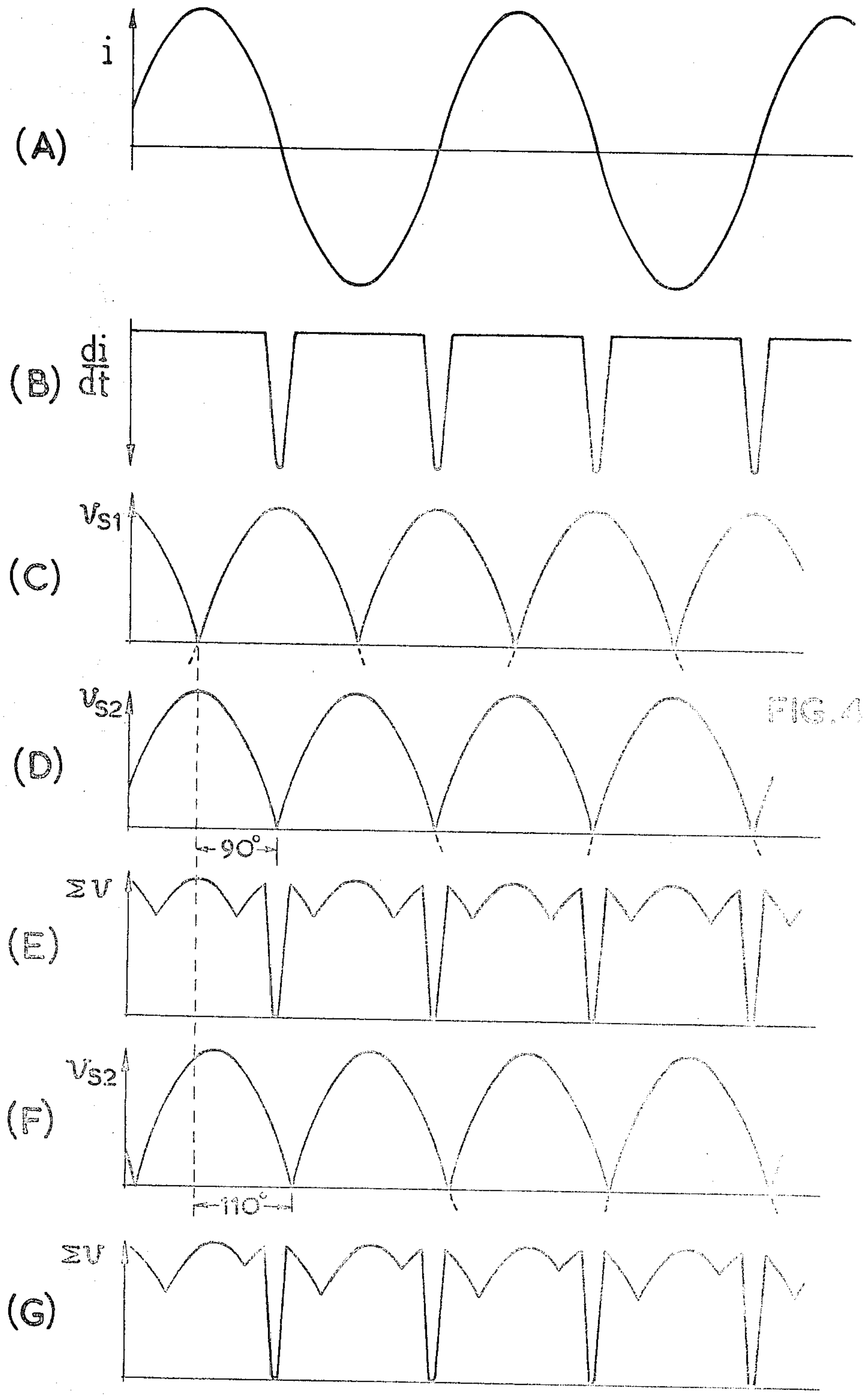
FIGS. 4A to 4G are waveforms obtained from various parts of the circuit in FIG. 2 under different conditions of operation.

To illustrate this point more clearly reference may be made to the waveforms in FIGS. 4A to 4G. FIG. 4A shows the current waveform on the secondary winding of transformer 13 and FIG. 4B shows the series of output pulses produced alternately across resistors 44, 45 (cf. FIGS. 3A and 3C). The voltage across the secondary winding 49 of transformer 33 is in phase quadrature with the current and the full-wave rectified output from the bridge rectifier 48 connected to this winding is shown in FIG. 4C. FIG. 4D similarly shows the output from the bridge rectifier 55 connected to the secondary winding 57, the phase-shifting circuit being effective to shift the voltage applied to this rectifier by 90° with respect to that applied to the bridge rectifier 48. Recalling that only the largest of the outputs from the bridge rectifiers 48, 55 is developed across resistor 46, the resultant summation of the waveforms in FIGS. 4B–4D and applied to the output stage 11 is as shown in FIG. 4E, from which it is evident that the relay is on the border of tripping, the waveform just failing to traverse the zero datum. In this instance, the fualt lies just at the boundary of the protected zone as selected by the circuit 8.

Similar conditions obtain with the voltage applied to the rectifier 55 shifted by 110° relatively to that applied to rectifier 48 (FIG. 4F) the resultant waveform in this instance being shown in FIG. 4G. The affect of varying the relative phase between these two voltages is to determine the shape of the relay characteristic, as defined on a complex R, X plane, adjustment of the potentiometer 58 governing the angular relationship at the limit of the forward "reach" of the relay as shown by the full lines in FIG. 5.

Figure 5:
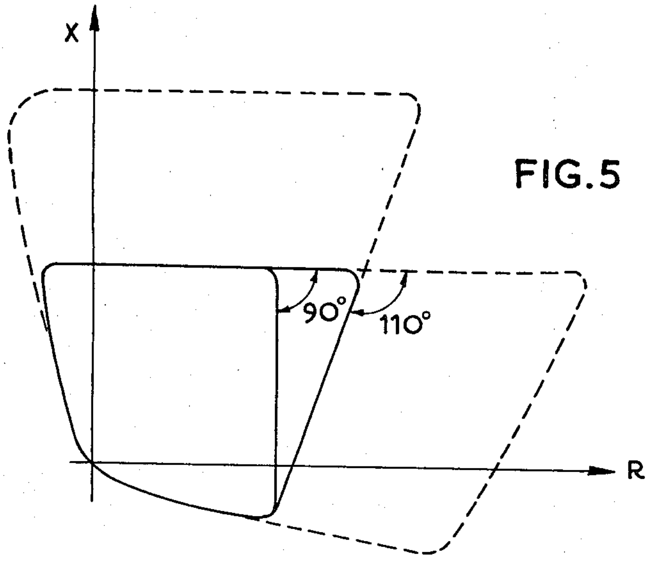
FIG. 5 shows the operating characteristic, as applicable to the measuring units.

The whole characteristic of FIG. 5 is built-up in dependence on the magnitude and phase relationship of the two waveforms in FIGS. 4C and 4D and the magnitude and phase relationship of the pulses in FIG. 4B, and although in FIGS. 4D and 4F the rectified output voltage is shown to be of the same amplitude as that in FIG. 4C if the time switch 54 is opened, presenting more resistance in series with the bridge rectifier 48, the amplitudes of the two voltages differ causing the "reach" of the relay to be extended in the direction of the X axis (as shown by the dotted lines in FIG. 5). Similarly adjustment of the resistor 61 will extend the reach in the R direction. In practice, the latter reach is preset, the extension of the reach in the X direction to a second zone being effected automatically by the time switch 54.

As mentioned above, the operation of the time switch, and thus the extension of protection from the first to the second zone, is governed by the starter unit, and this unit operates as a basic fault detector responsive to faults occurring over a wider field than that embraced by the first and second zones. Thus, with a fault occurring in zone one, both the starter (fault detector) and the measuring unit described will respond, the latter unit being operative to trip-out the breaker substantially instantaneously with fault inception so that the subsequent operation of the time switch 54 is of no consequence in this instance. With a fault occurring in zone two however, both the starter and the measuring unit again respond but the latter unit does not trip-out the breaker until it "sees" the fault upon the subsequent closure of the time switch. It follows therefore that the zone over which the starter unit is responsive must wholly embrace zones one and two and in fact the characteristic of this starter may conveniently be of the form shown in FIG. 6. The normal zones one and two are superposed in dotted lines on this characteristic and it will be evident that whereas these zones are unidirectional, extending forwardly of the relay location (as determined by the origin of the characteristic) the starting zone extends to some degree in the reverse direction in order to positively respond to all faults.

The circuitry of this starter or fault detector is basically the same as that shown in FIG. 2 but with some changes introduced in order to make the characteristic bi-directional.

Figure 7:
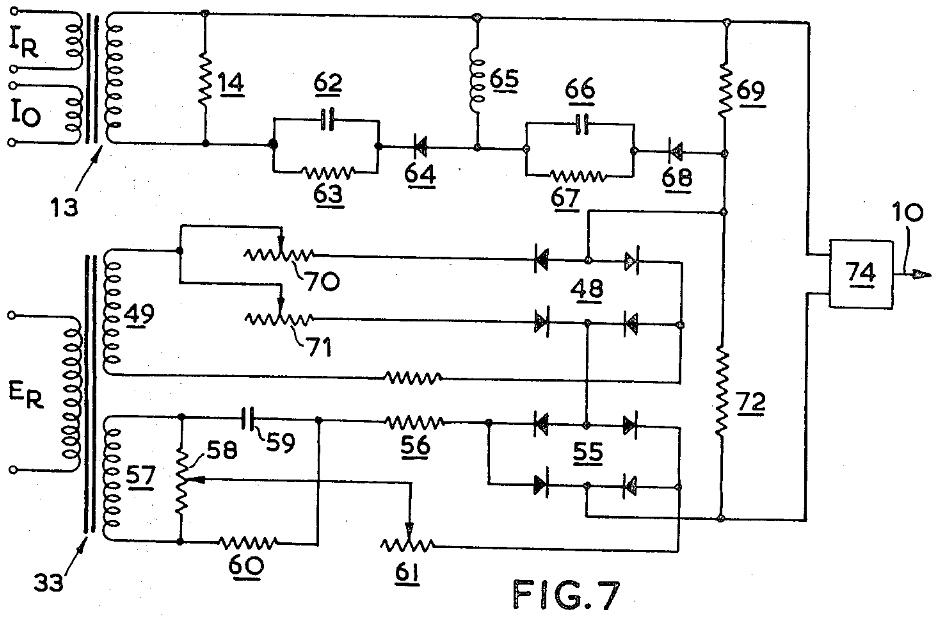
FIG. 7 is a detailed circuit diagram of the starter.

This circuit is shown in detail in FIG. 7 and parts similar to those shown in FIG. 2 have been similarly referenced and will not again be referred to in detail. In particular, the differentiator comprises in this instance a single capacitor 62 bridged by a resistor 63 and connected in series with a diode 64 and a shunt inductor 65, followed by a wave-shaper having a similar circuit configuration namely, capacitor 66, resistor 67 and diode 68. The resulting pulses developed across output resistor 69 are similar in form to those shown in FIG. 3B but they are unidirectional, by reason of the diodes 64, 68, and occur only once per cycle.

The circuitry for rectifying the line voltage derived in its true relationship with the current waveform is again similar to the corresponding circuit (8) in FIG. 2 but of course there is no provision for zone switching. Instead, the input voltages to the two halves of the bridge rectifier 48 are separately adjusted by variable resistors 70, 71 so that the magnitude of alternate half-cycles (positive) of the rectified output may differ from the intermediate (negative) half-cycles. The rectifying and phase shifting circuit is exactly the same as the corresponding circuit (9) in FIG. 2 and the largest output from the two series bridges 48, 55 appears across a resistor 72. The resultant voltage across the two series resistors 69, 72 is fed to an output stage 74 which, like the stage 11, is polarity-sensitive, and should any portion of this normally unidirectional waveform traverse the zero datum an output will be produced effective to initiate a timing sequence for operating the time switch 54 (FIG. 2).

Figure 6:
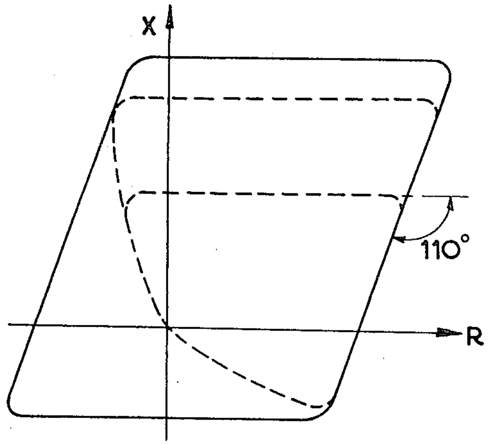
FIG. 6 shows the starting characteristic, as applicable to the starter unit.
Figure 8:
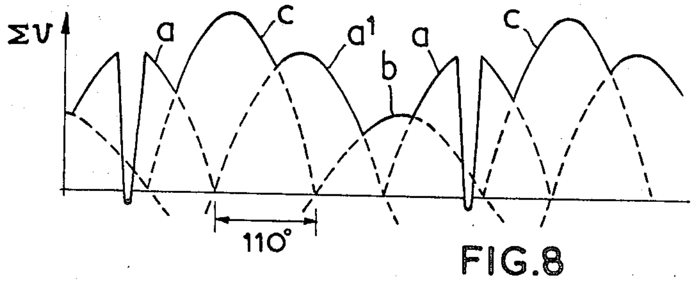
FIG. 8 shows a composite waveform obtained from the circuit of FIG. 7 and in accord with the characteristic shown in FIG. 6.

A typical waveform applied to this output stage 74, and which will yield the characteristic given in FIG. 6, is shown in FIG. 8, the placing of the *di/dt* pulses corresponding in this instance to a fault occurring near the boundary of the starting zone and lying on the R axis, in its negative region, in FIG. 6. The portions *a*, *a'* of the waveform are due to the output from the bridge rectifier 55 and the portions *b* and *c* are due to the separate half-wave outputs from rectifier 48, and it can be shown that the four limiting corners of the characteristic, proceeding clockwise from the bottom left-hand corner, are defined by the *di/dt* pulse being located respectively at the intersections of portions *c*, *a*; *a*, *b*; *b*, *a'*; and *a'*, *c*.

Although the invention has been described above with reference to particular forms of relay characteristic, both zonal and starting, it is to be understood that various other composite characteristics may readily be derived merely by choice of the relative phasing of the waveforms or by extending the technique employed in FIG. 7 of separately controlling the two halves of the bridge rectifiers employed. Thus, for example, by omitting the output from winding 57 in FIG. 7 the resultant starting characteristic will be determined by the two lines parallel to the R axis in FIG. 6, reaching to infinity in either direction. In addition, in some cases, particularly where saturating transformers are employed, more accurate measurements may be obtained if the current derivative is determined at an instant immediately following the zero transition of the current waveform since some degree of magnetic remanence may otherwise affect this quantity, and it is to be understood that the various references to "current zero" cover sensibly minor deviations from this instant.

I claim:

1. A distance relay for protecting an A.C. transmission system from faults, comprising
 first apparatus including
  first monitoring means for monitoring the current in the system and sensing the instant at which it traverses its zero datum,
  second monitoring means for monitoring the voltage of the system,
  phase-shift means for phase-shifting the monitored voltage by a predetermined amount,
  circuit means for rectifying said monitored voltage together with the phase-shifted voltage,
  a summator for adding together the largest instantaneous value of the rectified unidirectional voltages with the derivative of the current at the said instant, and
  an output device operable in response to any portion of the waveform of the summated quantities traversing the zero datum upon the current derivative exceeding in magnitude, and opposing in sign, the rectified voltages.

2. A relay according to claim 1, including
 second apparatus in accord with the first apparatus as defined above, the operating characteristic defined by the first apparatus embracing a number of contiguous zones of the A.C. system at increasing distances from the relay location whereas the operating characteristic of the second apparatus completely embraces all of the said zones, and wherein the output device of the second apparatus is operative to develop a control signal in response to a fault within any one of said zones whereby to cause the first apparatus to scan all of its zones in succession for this fault, the first apparatus further comprising
 a circuit breaker, and wherein the operation of the output device in said first apparatus is effective to actuate the circuit breaker and isolate the said fault.

3. A relay according to claim 2, comprising
 a differentiator by which the derivative of the monitored current in said first apparatus is obtained, said differentiator being responsive to an alternating voltage proportional to said monitored current, and comprising
 two identical networks separately operative upon the two half cycles of the waveform.

4. A relay according to claim 3, wherein the said networks each have an input and an output and comprise
 two diodes connected back-to-back at their input across which the alternating voltage is applied and having a common junction therebetween,
 two inductors having a common junction therebetween and each being separately connected in series with a further diode,
 connecting means connecting together the two common junctions, a parallel RC circuit connected in each network both between the said diodes in that network and at the output of the network, and
 further series diodes connected to the output RC circuit.

5. A relay according to claim 3, comprising
 a switching circuit for controlling the inputs to the summator from the differentiator, the switching circuit comprising
  two gates for which control signals are developed from the monitored voltage, said control signals alternating in polarity in synchronism with the differentiated current pulses whereby successively to open the two gates and present these pulses unidirectionally to the summator.

6. A relay according to claim 5, wherein the duration and polarity of the control signals are predetermined to present to the summator only those differentiated pulses which occur in a certain phase relationship with the monitored voltage.

7. A relay according to claim 3, wherein the circuit means in said first apparatus comprises
 two series-connected bridge rectifiers,
 a first network connected to one bridge for presenting the monitored voltage thereto and
 a second network connected to the other bridge for imparting a phase shift to the monitored voltage, the first network being governed by the control signal from said second apparatus whereby to vary the amplitude of the monitored voltage and affect the operating characteristic defined by said first apparatus.

8. A relay according to claim 2, comprising
 a differentiator by which the derivative of the monitored current in said second apparatus is obtained, said differentiator circuit being responsive to an alternating voltage proportional to said monitored current, and comprising
  a parallel RC circuit across which said voltage is applied,
  a diode and
  an inductor connected in series with the RC circuit, and
  a further parallel RC circuit at the output of the differentiator connected to the junction between the diode and inductor, the input to the summator being presented directly from the differentiator.

9. A relay according to claim 2, wherein the circuit means in said second apparatus comprises
 two series-connected bridge rectifiers,
 a first network connected to one bridge for presenting the monitored voltage thereto,
 a second network connected to the other bridge for imparting a phase shift to the monitored voltage, and
 variable means connected in the first network whereby the amplitudes of the alternating voltage applied across each half of the said one bridge are separately variable whereby to affect the operating characteristic defined by this second apparatus.

References Cited

UNITED STATES PATENTS

| | | | |
|---|---|---|---|
| 3,178,616 | 4/1965 | Blackburn et al. | 317—36 X |
| 3,192,442 | 6/1965 | Warrington et al. | 317—36 |
| 3,474,333 | 10/1969 | Hoel | 317—36 X |

JAMES D. TRAMMELL, Primary Examiner

U.S. Cl. X.R.

317—36; 324—52